(No Model.)

E. W. GOSS.
ELECTRIC MOTOR CAR TRUCK.

No. 436,779. Patented Sept. 23, 1890.

WITNESSES:
Frank S. Ober
Thomas K. Trenchard

INVENTOR
Elbert W. Goss.
BY
W. E. Johnston
ATTORNEY.

UNITED STATES PATENT OFFICE.

ELBERT W. GOSS, OF AMESBURY, MASSACHUSETTS.

ELECTRIC-MOTOR-CAR TRUCK.

SPECIFICATION forming part of Letters Patent No. 436,779, dated September 23, 1890.

Application filed March 17, 1890. Serial No. 344,162. (No model.)

*To all whom it may concern:*

Be it known that I, ELBERT W. GOSS, a citizen of the United States, residing in Amesbury, in the county of Essex and State of Massachusetts, have invented certain new and useful Improvements in Electric-Motor-Car Trucks, of which the following is a specification.

My invention relates to the improvements in the motor-gearing of electrically-propelled vehicles—such as tramway-cars, dummies therefor, or other rolling-stock—and my object is to connect the motor with the driving-axle by means of a system of gears and independently-movable clutches, whereby the speed of the car or other vehicle may be varied without altering the speed of the motor, and consequently the full power of the motor may be utilized for starting or moving up-grade at low speed, and also, when desired, the speed of the car may be increased without regulating the speed of the motor.

My invention consists in the construction and combination of parts hereinafter described, and pointed out in the claims.

Figure 1:
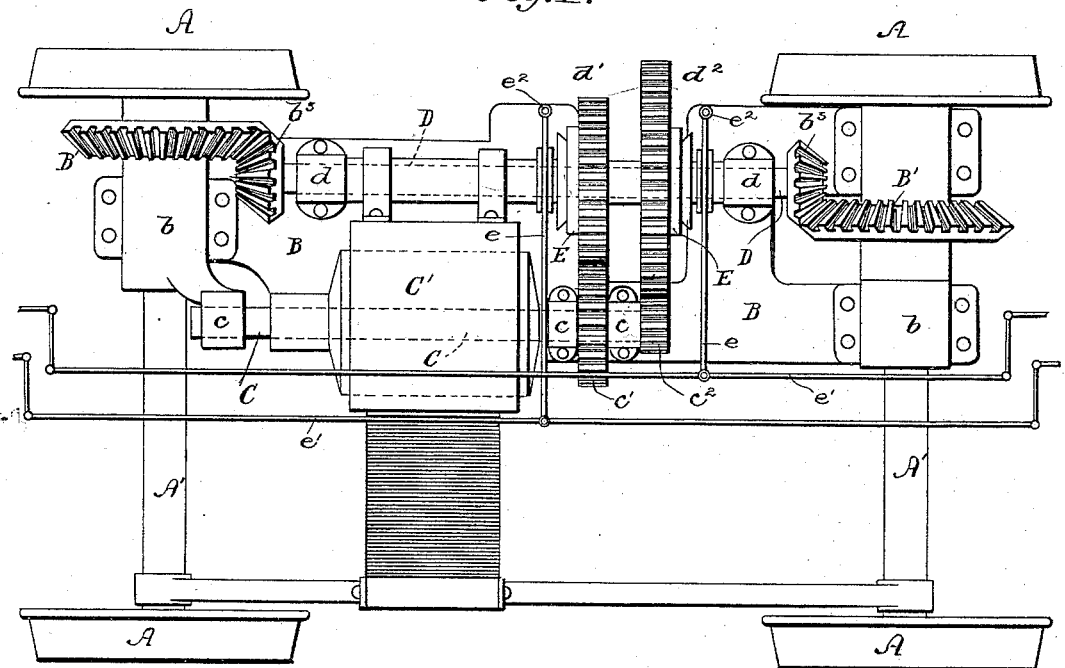
Figure 2:
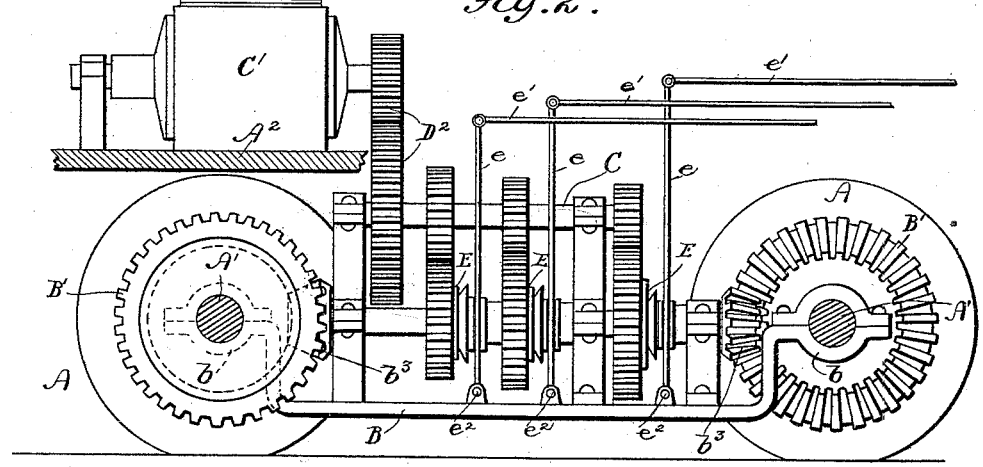

In the drawings which accompany and form a part of this specification, Figure 1 is a plan view of a car-truck and motor with my improvements applied, and Fig. 2 is a side elevation of a somewhat modified construction.

Referring to Fig. 1, A indicates the traction-wheels and A' the driving-axles of a car. To the axles is hung a frame B for supporting the motor and connections, the axles passing through bearings at $b$. Bevel-gears B' are also secured to the said axles. The frame B is provided with bearings $c$ for armature-shaft C and bearings $d$ for counter-shaft D. The motor C' may be of any preferred form. On the armature-shaft C are secured two spur-pinions $c'$ and $c^2$, of different diameter and meshing with the two spur-gears $d'$ and $d^2$, which are of correspondingly-varying diameters and fitted to revolve, but have no longitudinal movement upon the counter-shaft D. Each of the spurs $d'$ and $d^2$ is provided with one part of a clutch E, the other part being splined to the counter-shaft and arranged to be moved into or out of contact with the first-mentioned part by means of a lever $e$, fulcrumed at $e^2$, and having connecting-rods $e'$, whereby the same may be operated from either end of the car. The clutches are not shown in detail, as any form of friction or positive clutch may be used. The outlines, however, represent an ordinary form of cone friction-clutch. At each end of the counter-shaft is a bevel-pinion $b^3$, meshing with the bevel-gears B' on driving-axles A'. From this description it will be readily understood that when the driver or motor-man desires to alter the relative power and speed materially he simply operates the connecting-rods $e'$ to disengage one clutch and then engage the other clutch, or both clutches can be disengaged so as to stop the car or allow it to be moved by inertia or gravity regardless of the revolution of the armature-shaft.

Of course minor alterations in speed can be obtained by regulating the speed of the motor in the ordinary way.

More than two clutch-and-gear connections between the shafts may be employed—for instance, three such are shown in Fig. 2.

In Fig. 1 is shown the construction or relative arrangement of the parts for an ordinary car where it is desirable to have all parts located below the floor; but in Fig. 2, besides the increase in the number of clutch-connections, I illustrate an arrangement desirable for a locomotive or dummy. In said Fig. 2 the motor is removed from the shaft C and mounted upon the floor $A^2$ of the dummy, the armature-shaft being geared to shaft C by spur-gears $D^2$.

It will be understood that the counter-shaft, instead of being geared to the driving-axles, as shown, may itself be a driving-shaft carrying traction-wheels; or, instead of the said shaft being located at a right angle to the axles, it may be parallel therewith and geared thereto by spur instead of bevel gears.

Among some of the advantages of my improved construction are the saving of power and electric current in ascending grades, rounding curves, and starting of the car, and the use of a small motor being sufficient where ordinarily a larger one would be required. When a heavy grade or a bad curve is encountered with the motor or armature-shaft running at full speed, if there is not sufficient power with the clutch shown at the left in use the driver throws into engagement instead the clutch shown at the right, resulting in obtaining more power with less speed.

Having now described my invention, what I claim is—

1. In a truck for electrically-propelled vehicles, the combination, with two car-axles, each provided with a bevel-gear, and a motor-shaft arranged at right angles to the axles, of a counter-shaft carrying a bevel-pinion at each end engaging, respectively, with the gears on the axles, differential intermeshing gearing arranged directly upon the motor and counter-shafts, the gears in the counter-shaft being loose thereon, and clutches on the counter-shaft for connecting and disconnecting the respective loose gears with their shaft, for the purpose set forth.

2. In a truck for electrically-propelled vehicles, the combination, with two car-axles, each provided with a bevel-gear, and a motor-shaft arranged at right angles to the axles, of a counter-shaft carrying a bevel-pinion at each end engaging, respectively, with the gears on the axles, differential intermeshing gearing arranged directly upon the motor and counter shafts, the gears in the counter-shaft being loose thereon, and clutches on the counter-shaft for connecting and disconnecting the respective loose gears with their shafts, a lever for each clutch, and an operating-rod connected to each said lever, as described.

In witness whereof I have hereunto signed my name in the presence of two subscribing witnesses.

ELBERT W. GOSS.

Witnesses:
CHARLES A. CURRIER,
WILLIAM W. TUXBURY.